(12) United States Patent
Gibson et al.

(10) Patent No.: US 10,120,084 B2
(45) Date of Patent: Nov. 6, 2018

(54) X-RAY DETECTOR APPARATUS

(71) Applicant: IBEX Innovations Ltd., Sedgefield Durham (GB)

(72) Inventors: Gary Gibson, Sedgefield Durham (GB); Kurt Scott, Sedgefield Durham (GB)

(73) Assignee: IBEX INNOVATIONS LTD., Sedgefield Durham (GB)

( * ) Notice: Subject to any disclaimer, the term of this patent is extended or adjusted under 35 U.S.C. 154(b) by 0 days.

(21) Appl. No.: 14/891,472

(22) PCT Filed: May 16, 2014

(86) PCT No.: PCT/GB2014/051525
§ 371 (c)(1),
(2) Date: Nov. 16, 2015

(87) PCT Pub. No.: WO2014/184589
PCT Pub. Date: Nov. 20, 2014

(65) Prior Publication Data
US 2016/0084972 A1 Mar. 24, 2016

(30) Foreign Application Priority Data
May 16, 2013 (GB) .................................. 1308818.2

(51) Int. Cl.
*G21K 1/12* (2006.01)
*G01T 1/29* (2006.01)
*G01T 1/20* (2006.01)
*G21K 1/10* (2006.01)

(52) U.S. Cl.
CPC .............. *G01T 1/2985* (2013.01); *G01T 1/20* (2013.01); *G21K 1/10* (2013.01)

(58) Field of Classification Search
CPC ........ A61B 6/205; A61B 6/583; A61B 6/4035
USPC ........ 378/4, 207, 11, 18, 26, 98.8, 98.4, 901
See application file for complete search history.

(56) References Cited

U.S. PATENT DOCUMENTS

| 3,950,613 | A | | 4/1976 | Macovski | |
|---|---|---|---|---|---|
| 3,965,358 | A | | 6/1976 | Macovski | |
| 5,301,108 | A | * | 4/1994 | Hsieh | A61B 6/032 378/8 |
| 5,661,774 | A | * | 8/1997 | Gordon | G01N 23/046 378/101 |
| 5,841,835 | A | * | 11/1998 | Aufrichtig | A61B 6/583 378/204 |

(Continued)

FOREIGN PATENT DOCUMENTS

| DE | 102007058447 A1 | 6/2009 |
|---|---|---|
| EP | 1063538 A2 | 6/2000 |

(Continued)

OTHER PUBLICATIONS

PCT International Search Report, Application No. PCT/GB2014/051524, dated Sep. 26, 2014.

(Continued)

*Primary Examiner* — Don Wong
(74) *Attorney, Agent, or Firm* — MacMillan, Sobanski & Todd, LLC

(57) ABSTRACT

An x-ray detector apparatus includes at least one x-ray detector (3) having a position for a material under test (2), an x-ray source (1), and a plurality of structures (4) each configured to perturb an x-ray energy spectrum differently. The structures (4) may be placed in the path of the x-ray energy spectrum sequentially or concurrently. A plurality of x-ray detectors (3) may be formed into a linear array.

20 Claims, 5 Drawing Sheets

(56) References Cited

U.S. PATENT DOCUMENTS

| | | | |
|---|---|---|---|
| 6,231,231 B1* | 5/2001 | Farrokhnia | A61B 6/583 378/204 |
| 6,674,835 B2* | 1/2004 | Kaufhold | A61B 5/4869 378/207 |
| 7,200,201 B2 | 4/2007 | Unger et al. | |
| 7,382,853 B2 | 6/2008 | Arenson et al. | |
| 8,155,729 B1 | 4/2012 | Hsieh et al. | |
| 8,199,875 B2 | 6/2012 | Chandra et al. | |
| 8,243,875 B2 | 8/2012 | Xu et al. | |
| 8,311,182 B2 | 11/2012 | Chandra et al. | |
| 8,363,779 B2 | 1/2013 | Chandra et al. | |
| 8,378,310 B2 | 2/2013 | Bornefalk et al. | |
| 8,406,373 B2 | 3/2013 | Graham et al. | |
| 2004/0264626 A1* | 12/2004 | Besson | A61B 6/032 378/4 |
| 2010/0226478 A1* | 9/2010 | Harding | G21K 1/025 378/70 |
| 2012/0163554 A1* | 6/2012 | Tada | A61B 6/4035 378/154 |

FOREIGN PATENT DOCUMENTS

| | | |
|---|---|---|
| WO | 2004054329 A2 | 6/2004 |
| WO | 2006044692 A2 | 4/2006 |
| WO | 2008068690 A2 | 6/2008 |
| WO | 2008142446 A2 | 11/2008 |
| WO | 2009125211 A1 | 10/2009 |
| WO | 2009130492 A1 | 10/2009 |
| WO | 2010136790 A1 | 12/2010 |
| WO | 2011110862 A1 | 9/2011 |
| WO | 2012063169 A1 | 5/2012 |

OTHER PUBLICATIONS

PCT International Search Report, Application No. PCT/GB2014/051506, dated Sep. 4, 2014.

PCT International Search Report, Application No. PCT/GB2014/051525, dated Sep. 9, 2014.

* cited by examiner

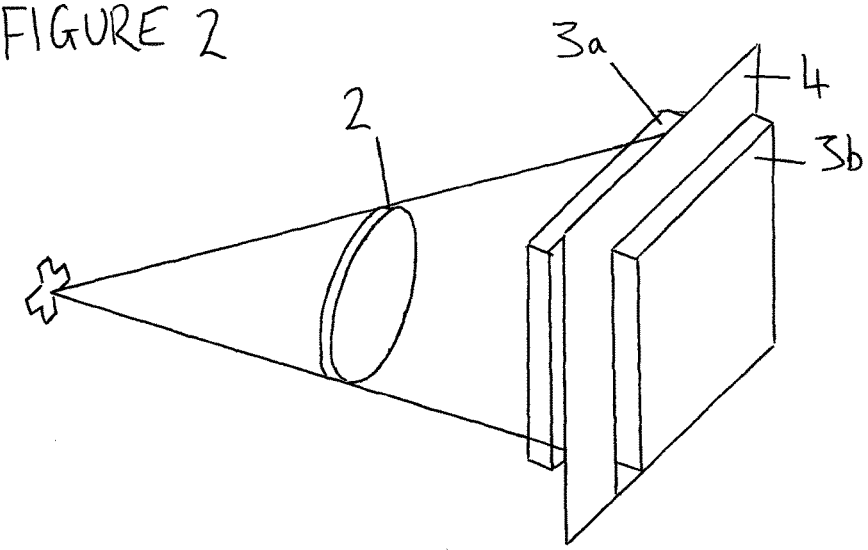
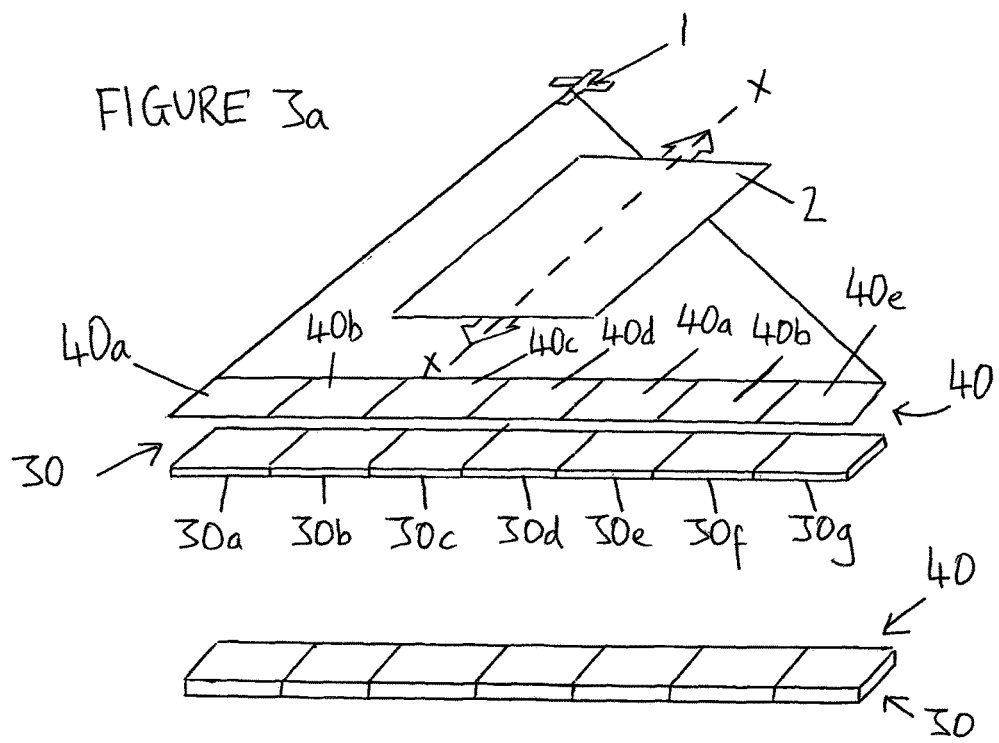

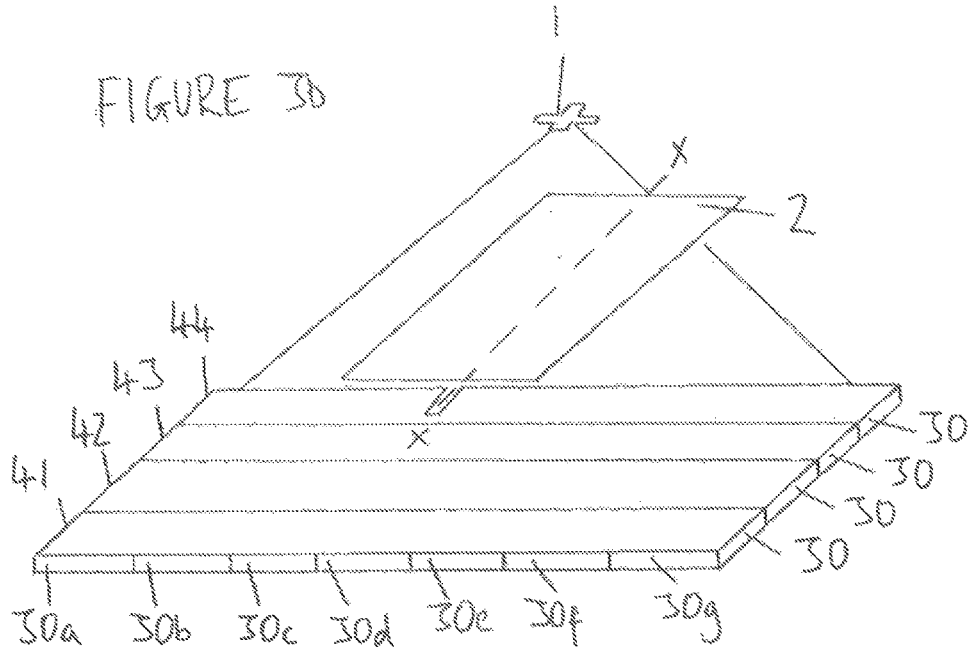
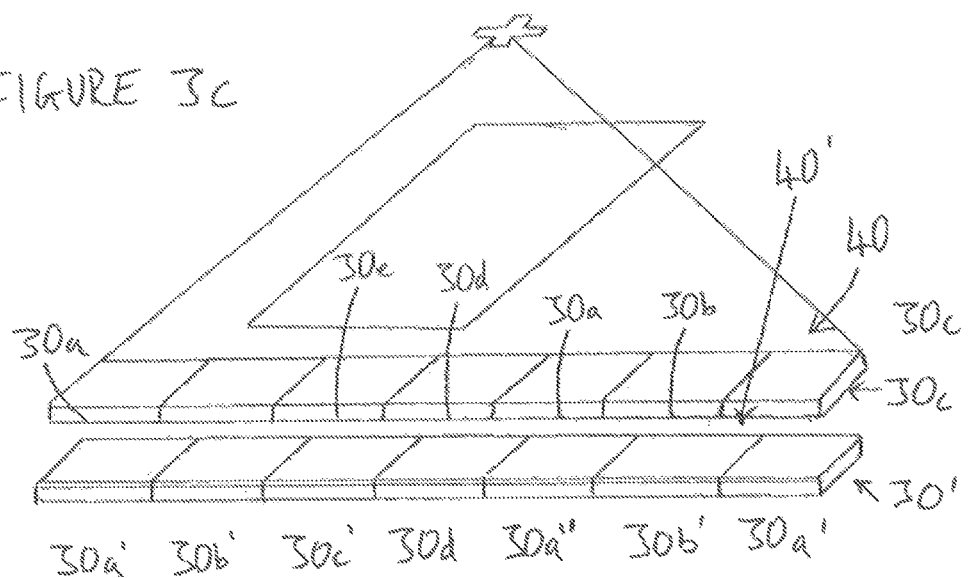

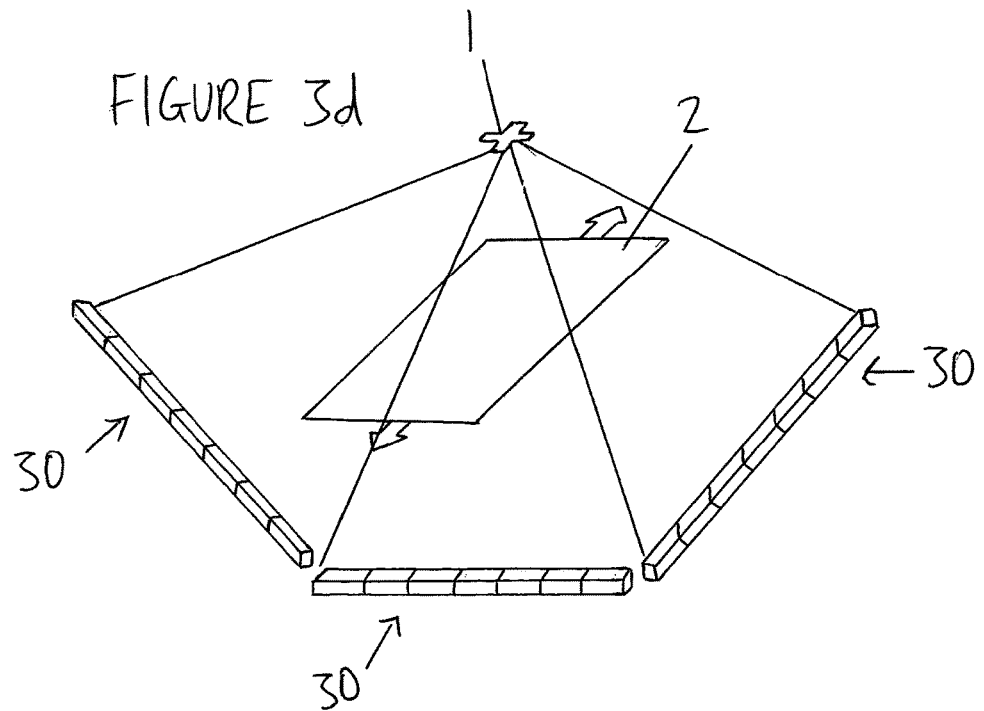
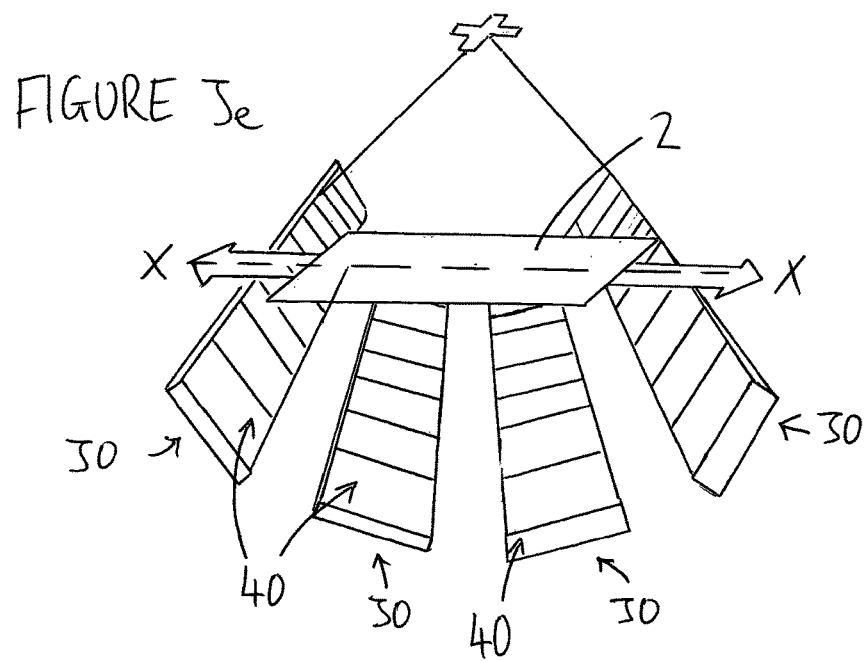

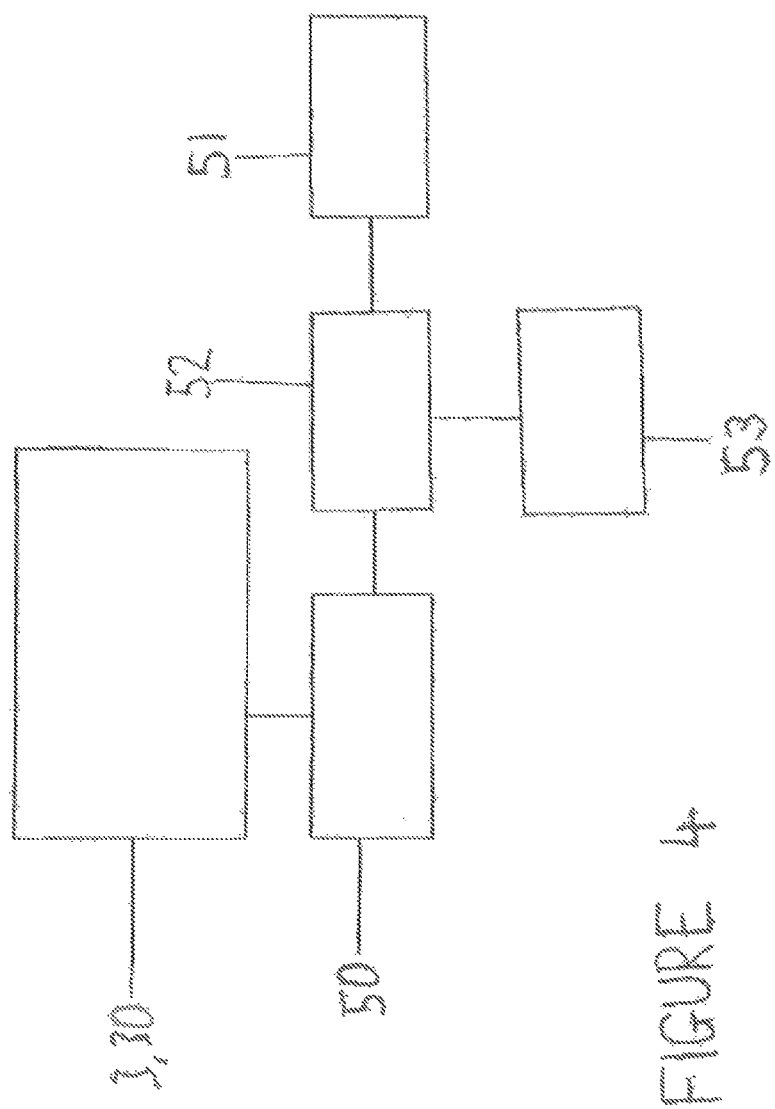

X-RAY DETECTOR APPARATUS

CROSS-REFERENCE TO RELATED APPLICATIONS

This application is the National Phase of International Application PCT/GB2014/051525 filed May 16, 2014, which designated the U.S. That International Application was published in English under PCT Article 21(2) on Nov. 20, 2014 as International Publication Number WO 2014/184589A1. PCT/GB2014/051525 claims priority to U.K. Application No. 1308818.2 filed May 16, 2013. Thus, the subject nonprovisional application also claims priority to U.K. Application No. 1308818.2 filed May 16, 2013. The disclosures of both applications are incorporated herein by reference.

FIELD OF THE INVENTION

The present invention relates to x-ray detection apparatus and in particular x-ray detection apparatus utilising filters.

BACKGROUND OF THE INVENTION

X-ray detectors have a wide variety of uses and are available in many configurations.

The present invention relates to x-ray detectors including structures configured to perturb an x-ray energy spectrum emanating from an x-ray source, prior to the x-ray energy spectrum impinging on an x-ray detector.

SUMMARY OF THE INVENTION

According to a first aspect of the invention there is provided an x-ray detection apparatus as specified in Claim 1. Preferred aspects of the apparatus of this aspect of the invention are specified in the claims dependent on Claim 1, the description and the drawings.

According to a second aspect of the invention there is provided a method of analysing at least one material property of a substance as specified in Claim 11. Preferred aspects of the method of this aspect of the invention are specified in the claims dependent on Claim 15, the description and the drawings.

According to the invention there is provided an x-ray/gamma-ray detection apparatus, the apparatus including at least one x-ray/gamma-ray detector comprising, and a plurality of structures each configured to perturb an x-ray/gamma-ray energy spectrum differently, wherein said structure lies next to the at least one x-ray/gamma-ray detector.

The apparatus may include a position for a material under test.

The apparatus may include an x-ray/gamma-ray source.

Preferably, the x-ray/gamma-ray source, at least one of the at least one x-ray/gamma-ray detector, the position for a material under test, and one of the plurality of structures are aligned wherein the x-ray/gamma-ray source is arranged to direct an x-ray/gamma-ray energy spectrum to impinge upon the at least one x-ray/gamma-ray detector, the structure configured to perturb the x-ray/gamma-ray energy spectrum, and positioned material under test, wherein said structure lies between the position for material under test and the x-ray/gamma-ray detector.

The combination of the detector and the plurality of structures without the x-ray/gamma-ray source and position for a material under test is useful where the material under test is itself radio active.

Preferably, the or each x-ray/gamma-ray detector is a single pixel detector.

Preferably, the x-ray/gamma-ray detection apparatus, the or each x-ray/gamma-ray detector includes a scintillator.

Preferably, each of the plurality of structures is mounted on a member adapted to provide for placing of a selected one of the plurality of structures such that it lies in alignment with the at least one x-ray/gamma-ray detector.

Preferably, the member is a wheel and the structures are mounted on the wheel.

Preferably, the apparatus further comprises means to move the member so as to place a selected one of the plurality of structures in alignment with the at least one x-ray/gamma-ray detector.

Preferably, the means to move the member includes a motor.

The x-ray/gamma-ray detection apparatus may comprise two x-ray/gamma-ray detectors aligned with each other and the x-ray/gamma-ray source, wherein the structure is situated between the two detectors.

The x-ray/gamma-ray detection apparatus may comprise a plurality of x-ray/gamma-ray detectors arranged in a linear array.

Preferably, each x-ray/gamma-ray detector is associated with a structure and each structure is different to its adjacent structure.

The x-ray/gamma-ray detection apparatus may comprising two linear arrays of x-ray/gamma-ray detectors aligned with each other and the x-ray/gamma-ray source.

Preferably, each x-ray/gamma-ray detector of one or both of the two linear arrays is associated with a structure and each structure is different.

The x-ray/gamma-ray detection apparatus may comprise at least two linear arrays of x-ray/gamma-ray detectors, and wherein the linear arrays lie in different planes.

The x-ray/gamma-ray detection apparatus may comprise a plurality of linear arrays of x-ray/gamma-ray detectors and a plurality of structures, each linear array associated with one of the plurality of structures and wherein adjacent structures are different.

According to an aspect of the invention there is provided a method of analysing at least one material property of a substance using x-ray/gamma-ray detection apparatus of the invention, comprising the steps of:
 a) Positioning a material in the apparatus;
 b) Causing the x-ray/gamma-ray source to direct an x-ray/gamma-ray energy spectrum to impinge upon the at least one x-ray/gamma-ray detector, one of the plurality of structures configured to perturb the x-ray/gamma-ray energy spectrum, and positioned material under test;
 c) Causing the x-ray/gamma-ray source to direct an x-ray/gamma-ray energy spectrum to impinge upon the at least one x-ray/gamma-ray detector, another of the plurality of structures configured to perturb the x-ray/gamma-ray energy spectrum, and positioned material under test;
 d) Repeating step b for other structures of the plurality thereof one or more times;
 e) Analysing the signal of detector at each step or repeated step.

The method may comprise the further step of recording the signals for detector with each different structure of the plurality of structures present and comparing the recorded signals with the recorded signals for the detector when successive structures are aligned with the x-ray/gamma-ray source and the detector.

The method may comprise the further step of performing the step of Claim 16 without the object present.

The method may comrpise the further step of comparing the current differences between recorded signals between detectors when successive structures are aligned with the x-ray/gamma-ray source and the detector as determined by previous method steps.

The method may comprise the further step of following previous method steps for at least one known material and storing the differences in a database, and comparing the differences between recorded signals for an object under test with the differences between recorded signals in the database.

The method may comprise the further step of producing at least one output representative of the at least one material property.

The method may comprise the further step of displaying the at least one output on a display means.

BRIEF DESCRIPTION OF THE DRAWINGS

In the Drawings, which illustrate preferred embodiments of x-ray detector apparatus according to the invention:

FIG. 2 is a schematic representation of a two stage x-ray detector apparatus;

FIG. 3*a* is a schematic representation of a linear array x-ray detector;

FIG. 3*b* is a schematic representation of a multi-linear array x-ray detector;

FIG. 3*c* is a schematic representation of a two stage linear array x-ray detector;

FIG. 3*d* is a schematic representation of a three dimensional multi-linear array x-ray detector;

FIG. 3*e* is a schematic representation of an alternative three dimensional multi-linear array x-ray detector, and FIG. 4 is a block diagram illustrating an embodiment of the invention.

DETAILED DESCRIPTION OF THE PREFERRED EMBODIMENTS

Figure 1A:
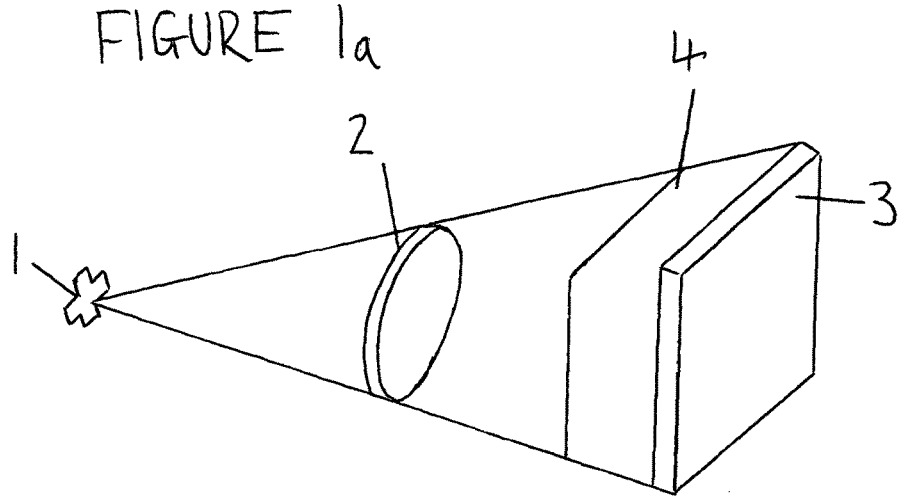
FIG. 1*a* is a schematic representation of an embodiment of a single pixel x-ray detector.

FIG. 1*a* illustrates a single shot x-ray detector apparatus comprising an x-ray source 1, an object 2, a single pixel x-ray detector 3 and a filter 4. The x-ray detector may be of the indirect type utilising a scintillator to convert incident x-ray photons into visible spectrum photons, those visible spectrum photons being converted to an electrical signal. Alternatively, the detector may be a silicon drift detector or a hybrid detector.

In FIG. 1*a* a single filter 4 is shown. The filter 4 perturbs the x-ray shadow of the object 2 in a defined and known manner. Using one filter in this way it would be possible to detect the presence of an isotope. However, in order to detect not only the presence of a radio-active isotope, but also the identity of the isotope it is necessary to obtain one shot with one filter and another shot with a different filter. However, in order to achieve this, the radio isotope must be present for a sufficiently long time for the filter 4 to be changed.

Figure 1B:
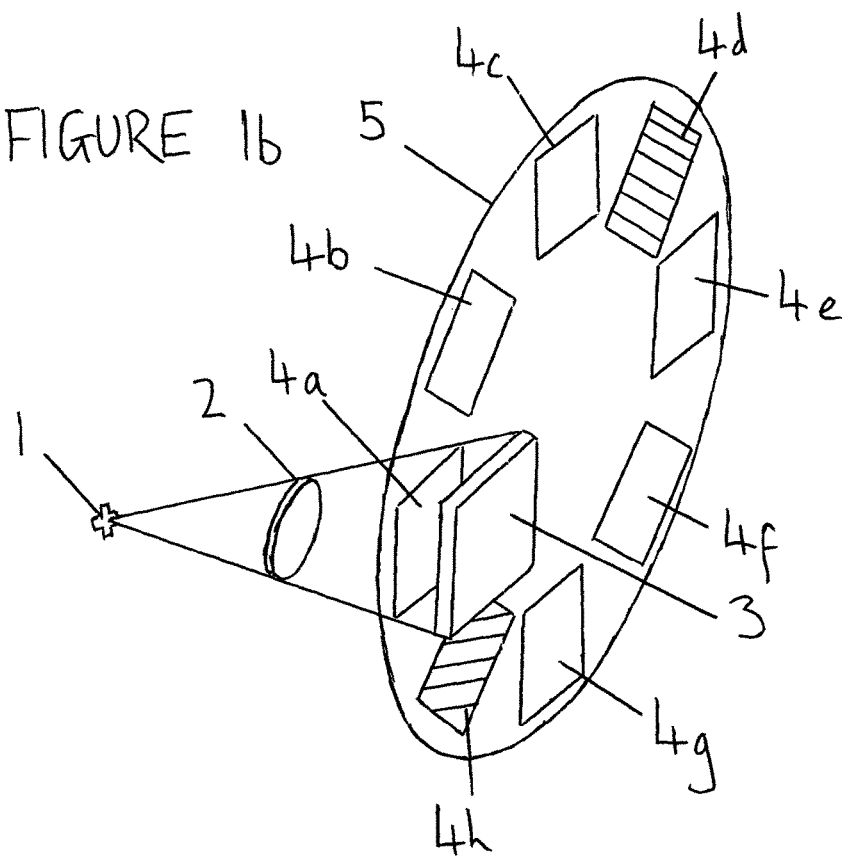
FIG. 1*b* is a schematic representation of an alternative configuration of the embodiment illustrated in FIG. 1*a*.

In FIG. 1*b*, the filter 4 is one of a plurality of filters 4*a* to 4*b* all mounted on a wheel 5. By rotating the wheel 5, multiple shots of the object may be taken, each shot having the x-ray shadow of the object 2 perturbed in a different and known manner. Information from such a set of shots may be used to derive material type and thickness information.

Referring now to FIG. 2, the multi-shot detector apparatus comprises an x-ray source 1, an object 2, a first detector 3*a*, a second detector 3*b* and a filter 4 situated between the two detectors 3*a*, 3*b*.

X-rays emitted from the x-ray source 1 pass through the object 2, which attenuates the x-ray signal, through the first detector 3*a* and filter 4, each of which further attenuates the x-ray signal, finally impinging on the detector 3*b*. Detectors 3*a* and 3*b* are both single pixel detectors. A significant amount of information about the object can be gained by detecting the x-rays attenuated only by the object 2, and those x-rays attenuated by the first detector 3*a* and the filter 4.

FIGS. 3*a* to 3*e* illustrate linear array x-ray detectors, also known as 2-D cameras. This type of linear array detector is typically used in industrial applications, often to inspect items carried on conveyors, for example in airport security. As the item passes by the linear array, images of the part of the item aligned with the linear array are taken. These images are stacked together to form an image of the item.

The embodiments of the invention illustrated in FIGS. 3*a* to 3*e* include a multi-absorption plate. The multi-absorption plate includes a plurality of regions configured to create different pertubations in the x-ray energy spectrum emanating from an x-ray source.

FIG. 3*a* illustrates a linear array x-ray detector apparatus comprising an x-ray source 1, a linear array detector 30 comprising x-ray detector elements 30*a* to 30*g*, and a multi-absorption plate 40 a repeating array of absorption elements 40*a* to 40*d*, each of the absorption elements 40*a* to 40*d* absorbing an incident x-ray energy spectrum differently. An object 2 travels along the axis x-x. For example the object 2 may be mounted on a conveyor, with the x-ray source 1 being mounted above the conveyor and the linear array detector 30 and multi-absorption plate 40 being mounted below.

The lower x-ray detector 30 shown in FIG. 3*a* is an alternative to the x-ray detector described above. In this x-ray detector 30 the multi-absorption plate is attached to the x-ray detector 30.

The x-ray detector elements 30*a* to 30*g* may be of the indirect type utilising a scintillator to convert incident x-ray photons into visible spectrum photons, those visible spectrum photons being converted to an electrical signal. Alternatively, other types of x-ray detector may be used, such as a silicon drift detector, a hybrid detector or a direct detector.

The presence of the multi-absorption plate 40 imposes a plurality of energy shifts on the x-ray energy spectrum. With this additional information it is possible to make deductions as to the type and thickness of materials contained in the item 2. It is therefore possible to obtain very similar information with a reduced number of detectors and because the same linear array of detectors is being used, intrinsic variabily in the image is reduced. Whilst temporal errors are greater than would be the case with an arrangement using multiple linear array detectors, these errors can be minimised by for example synchronising the movement of the item, i.e. the conveyor on which it is situated, with the capture frame rate of the array.

Material type and/or thickness information may be embodied within an image captured by the x-ray detector elements 30*a* to 30*g*, for example by colour coding.

The FIG. 3*b* configuration comprises a plurality of linear array detectors 30, four linear array detectors being shown. Each linear array detector is comprised of x-ray detector elements 30a to 30g. In this embodiment rather than the x-ray detector elements 30a to 30g being aligned with a multi-absorption plate, the elements 30a to 30g of each detector 30 are aligned with an absorption plate 41-44, each absorption plate being uniform. However, whilst each of the absorption plates 41-44 is uniform, each is also different. Hence, each linear detector array 30 has its own unique absorption plate. As the item 2 moves past the linear arrays 30 along the axis x-x, an image is built up as each array 30 sees the same part of the item sequentially. The images captured by each linear array 30 are subject to a different x-ray energy shift due to the differences between the absorption plates 41-44. These different x-ray energy shifts allow the material and thickness of the item to be determined.

FIG. 3c illustrates a configuration similar to that shown in FIG. 3a, with an additional linear detector array 30' aligned beneath the linear detector array 30. Each of the linear detector arrays is provided with a multi-absorption plate 40 in the same way as described with reference to FIG. 3a. The apparatus follows the same principles as described with reference to the FIG. 2 embodiment, that is the signal detected by the second linear array detector 30' has been attenuated not only by the item 2 and the multi-absorption plate 40', but also the first linear detector array 30, and its associated multi-absorption plate 40. One of the multi-absorption plates 40, 40' may be omitted.

FIGS. 3d and 3e illustrate embodiments of linear array x-ray detector apparatus configured to provide three dimensional information about an object in addition to the materials and thickness identification provided for by the embodiments illustrated in FIGS. 3a to 3c.

The embodiment of FIG. 3d is essentially a variant of the embodiment illustrated in FIG. 3a, with second and third linear detector arrays 30 mounted to each side of a central linear detector array 30 and at an angle thereto.

In FIG. 3e a group of four linear detector arrays 30 is mounted beneath an item 2 moving along an axis x-x. Each of the linear detector arrays 30 is provided with a multi-absorption plate 40 as described with reference to FIG. 3a. An x-ray source 1 is mounted above the item 2 and the linear detector arrays 30. The detector arrays 30 lie parallel to one another and across the direction of travel x-x of the item 2, substantially normal thereto. However, as can be seen from FIG. 3, each linear detector array 30 lies at an angle to the neighbouring linear detector array 30.

The detector elements 30a to 30g, 30a' to 30g' may be single pixel x-ray detectors, or alternatively they may be cameras which may be low resolution x-ray cameras. Where the detector elements 30a to 30g, 30a' to 30g' are cameras the multi-absorption plate associated with the linear array may include different regions aligned with an individual detector.

To determine a material property of an object 2 the x-ray source 1 is caused to direct an x-ray energy spectrum through the object 2, the structure 4, 40, to impinge upon the detector 3a, 3b, 30a-30f. Visible wavelength photons emitted by the scintillator are then analysed according to the following steps:

Step (i)—The detectors 3a, 3b, 30a-30f are single pixel detectors: the intensity of visible wavelength photons recorded by the detector for each detector is compared with the recorded intensity for its adjacent or successive detectors and the differences in intensity are recorded;

Step (ii)—The intensity of visible wavelength photons recorded by each detector is compared with the recorded intensity for its adjacent or successive detectors and the differences in intensity are recorded without the object 3 present;

Step (iv)—The current differences between recorded intensities between adjacent detectors as determined by the method steps (i) and (ii) are compared;

Step (v)—Following the method steps (i) to (iv) for at least one known material and storing the differences in a database; and Step (vi)—Comparing the differences between recorded intensities for a substance under test with the differences between recorded intensities for known substances from the database.

Where the x-ray detector does not use a scintillator intensities and energies are recorded.

FIG. 4 is a block diagram of a system according to an embodiment of the invention in which the detector 3, 30 (which may be the detector of any of the previously described embodiments or other embodiments falling within the scope of the claims) provides an output to a data recording means 50. The data recording means is in communication with a data processor as is a database 51 in which data characteristic of known materials are recorded. The data recording means 50 and the database 51 are in communication with a data processor 52 which runs data processing software, the data processing software comparing information from the detector, preferably via the data recording means, and the database to determine a material property of an object 2. A data output interface 53, is preferably included to which a determination of the data processing software may be outputted. Such an interface 53 may be connected to a VDU or may cause an object to be accepted or rejected, for example where the apparatus is used in quality control.

It is not necessary that all values are stored in the database. Where matching values are not recorded in the database, a value for a material under test may be interpolated.

References herein to x-rays are references to x-rays and/or gamma-rays.

The structures configured to perturb the x-ray/gamma-ray energy spectrum are at least partially transparent to x-ray/gamma-ray radiation. Their function is to perturb rather than block the x-ray/gamma-ray energy.

The invention claimed is:

1. An x-ray/gamma-ray detection apparatus, the apparatus including:
    a plurality of x-ray/gamma-ray detectors arranged in at least one linear array,
    a conveyor providing a position for a material under test that moves in relation to the at least one linear array,
    an x-ray/gamma-ray source, and
    at least three adjacent structures arranged side by side in the same plane, wherein the plane of the at least three adjacent structures lies parallel with the at least one linear array, each structure configured to perturb an x-ray/gamma-ray energy spectrum differently from each other, the x-ray/gamma-ray source, the at least one linear array, the position for a material under test, and the at least three adjacent structures being aligned,
    wherein the x-ray/gamma-ray source is arranged to direct an x-ray/gamma-ray energy spectrum to impinge upon, in order, each of: a positioned material under test; the at least three adjacent structures configured to perturb the x-ray/gamma-ray energy spectrum; and the at least one linear array, wherein said structures lie between the position for material under test and the at least one linear array.

2. An x-ray/gamma-ray detection apparatus according to claim 1, wherein each x-ray/gamma-ray detector is a single pixel detector.

3. An x-ray/gamma-ray detection apparatus according to claim 1, comprising a repeating array of the at least three adjacent structures.

4. An x-ray/gamma-ray detection apparatus according to claim 1, wherein each x-ray/gamma-ray detector includes a scintillator.

5. An x-ray/gamma-ray detection apparatus according to claim 1, comprising at least two linear arrays of x-ray/gamma-ray detectors aligned with each other and the x-ray/gamma-ray source, wherein the at least two linear arrays are aligned with each other in a selected one of two arrangements: side by side, and one above the other.

6. An x-ray/gamma-ray detection apparatus according to claim 5, wherein each x-ray/gamma-ray detector of one of the two linear arrays is associated with one of the at least three structures.

7. An x-ray/gamma-ray detection apparatus according to claim 5, comprising at least three linear arrays of x-ray/gamma-ray detectors aligned side by side, wherein the detectors of each respective linear array are aligned with a common one of the at least three adjacent structures.

8. An x-ray/gamma-ray detection apparatus according to claim 5, comprising two linear arrays of x-ray/gamma-ray detectors aligned with each other one above the other and the x-ray/gamma-ray source, wherein the at least three structures are situated between the two detectors.

9. An x-ray/gamma-ray detection apparatus according to claim 8, further comprising another at least three adjacent structures situated above the upper linear array of x-ray/gamma-ray detectors.

10. An x-ray/gamma-ray detection apparatus according to claim 1, comprising at least two linear arrays of x-ray/gamma-ray detectors, and wherein the linear arrays lie in different planes.

11. A method of generating an x-ray/gamma-ray image using x-ray/gamma-ray detection apparatus according to claim 1, comprising the steps of:

a) Positioning a material in the apparatus;
b) Causing the x-ray/gamma-ray source to direct an x-ray/gamma-ray energy spectrum to impinge upon the detectors of the at least one linear array of x-ray/gamma-ray detectors, the structure configured to perturb the x-ray/gamma-ray energy spectrum, and positioned material under test; and
c) Analysing the signal of each detector of the or each linear array.

12. A method according to claim 11, wherein the method comprises the further step of recording the signals for each detector in the or each linear array of detectors and comparing the recorded signals with the recorded signals for adjacent detectors or groups of pixels.

13. A method according to claim 12, comprising the further step of performing the step of claim 12 without any object present after having performed the step of claim 11.

14. A method according to claim 13, comprising the further step of comparing the current differences between recorded signals between adjacent detectors.

15. A method according to claim 14, comprising the further step of following the method steps of claim 12 for at least one known material and storing the differences in a database, and comparing the differences between recorded signals for an object under test with the differences between recorded signals in the database.

16. A method according to claim 15 comprising the further step of producing at least one output representative of the at least one material property.

17. A method according to claim 16, comprising the further step of displaying the at least one output on a display means.

18. An x-ray/gamma-ray detection apparatus according to claim 5, wherein both of the at least two linear arrays are associated with one of the at least three structures.

19. An x-ray/gamma-ray detection apparatus according to claim 5, wherein the detectors of each of the at least two linear arrays have a capture frame rate, and wherein the movement of the conveyor is synchronized with the capture frame rate of the detectors of the at least two linear arrays.

20. An x-ray/gamma-ray detection apparatus according to claim 1, wherein the detectors of the at least one linear array have a capture frame rate, and wherein the movement of the conveyor is synchronized with the capture frame rate of the detectors of the at least one linear array.

* * * * *